United States Patent [19]

Vigneron

[11] 4,177,467

[45] Dec. 4, 1979

[54] WAVEGUIDE RECEIVING ANTENNA

[75] Inventor: Jean J. Vigneron, Saint-Germain les Arpajon, France

[73] Assignee: Regent Marine & Instrumentation, Inc., Buffalo, N.Y.

[21] Appl. No.: 887,925

[22] Filed: Mar. 20, 1978

[30] Foreign Application Priority Data

Mar. 24, 1977 [FR] France ............... 77 08700

[51] Int. Cl.² ............................................. G01S 3/28
[52] U.S. Cl. ................................. 343/119; 343/122; 343/776; 343/873
[58] Field of Search .............. 343/119, 122, 776, 873

[56] References Cited

U.S. PATENT DOCUMENTS

| 1,960,297 | 5/1934 | Chapman | 343/122 |
| 2,560,265 | 7/1951 | Adler, Jr. | 343/122 X |
| 2,751,586 | 6/1956 | Riblet | 343/776 X |
| 2,962,967 | 12/1960 | Bixby | 343/873 X |

Primary Examiner—Maynard R. Wilbur
Assistant Examiner—Richard E. Berger
Attorney, Agent, or Firm—Hosier, Niro & Daleiden, Ltd.

[57] ABSTRACT

An antenna for the short-range reception of an emitted signal comprises at least two independent sectors for the coarse location of an emission-beam source in two predetermined directions. Each sector is constituted by a waveguide having a single open face oriented in the intended direction of surveillance. A microwave diode is placed within each sector at right angles to, and at the geometrical center of, the supporting wall of the waveguide which is associated with the diode. The frequencies detected by the antenna are within the range of $10^9$ Hz to $30 \times 10^9$ Hz.

19 Claims, 4 Drawing Figures

WAVEGUIDE RECEIVING ANTENNA

This invention relates to a waveguide receiving antenna and more especially to a short-range omnidirectional antenna for pleasure boats and yachts, coastwise fishing craft as well as all boats equipped with radar sets.

The known radar detection system is constituted by a transmitter for the propagation of a modulated wave comprising a microwave carrier, by a detector for carrying out the detection of waves reflected by obstacles during the time intervals which elapse between two successive emissions, and by means for analyzing the reflected waves or echoes both in angular disposition and range by recording the positions of the antenna and analyzing the echo-return time. The different radar data thus recorded are then processed in order to locate the obstacles.

In practice, however, this known system can be employed only in large vessels of substantial tonnage since it entails the need for costly and sophisticated equipment, high electric power consumption and a considerable amount of space by reason of its overall bulk. Constant maintenance is also necessary by reason of its incorporated moving parts and mechanical linkages. In addition, this system almost invariably calls for the presence of a qualified operator who has the duty of keeping a frequent watch on the indicator screen.

The tracking system of known design for detecting a particular frequency is therefore essentially directional. Its most serious disadvantage lies in the need to carry out adjustments on the sensitivity of the antenna in order to adjust the gain to operational limits. Furthermore, its antenna is not lossless and coupled to the alarm device. The system is therefore unserviceable for continuous surveillance since it would prove necessary at each detection or in other words at each excitation of the sound or light alarm device to disconnect the antenna and locate the position of the obstacle detected with respect to the operator. In consequence, the antenna cannot be placed anywhere on board the boat but on the contrary at a readily accessible location.

As a result of the rapid development which is taking place in the field of recreational sailing, the number of yachts and pleasure craft is rising sharply and the same remark applies to fishing boats of small and medium tonnage. All these boats constitute obstacles and are detected by those which are equipped with radar sets. Now it is an undeniable fact that large boats are less readily manoeuvrable than small boats and that these latter should be warned of the proximity of large boats in order to permit a rapid and momentary change of course or to take evasive action with a view to keeping out of the way of large boats. Unfortunately, small craft are equipped neither with radar sets (on the understandable grounds of high capital cost) nor with means for enabling them to detect the presence of large boats from a distance.

The aim of the present invention is to propose a continuous surveillance system or in other words a system which is capable of continuously detecting any obstacles on the course followed by the boat, which is stationarily fixed, and which makes use of a light and sound indicator in order to locate any wave beam emitted in any direction while dispensing with any need for manipulation.

The invention is accordingly directed to a transmitting and receiving antenna which essentially comprises at least two sectors for the coarse location of an emission-beam source in two predetermined directions, each sector being constituted by a closed waveguide in which is placed a microwave transfer element, the dimension of each waveguide and the characteristics of said microwave transfer element which is associated with said waveguide being chosen in such a manner as to cover a predetermined range of frequencies.

In accordance with another distinctive feature, the open faces of the waveguides are located either in perpendicular planes or in parallel planes and outwardly oriented in opposite directions so as to cover approximately 180° of the horizon.

In accordance with yet another distinctive feature, the antenna is omnidirectional and comprises four wave guides each covering 90° of the horizon so as to cover 360° of the horizon, said waveguides being grouped together for example so as to constitute a unitary structure, thus making it possible to reduce the overall size of the antenna and to place this latter anywhere on the boat, for example at the top of a mast.

In accordance with a further distinctive feature, the microwave transfer element is primarily a receiving and/or transmitting unit, the signal delivered by said transfer element when it is employed as a detector or receiver being amplified before exciting an alarm system constituted in particular by light and/or sound indicators within a box located at a distance from the antenna.

This makes it possible to mount the antenna in a stationary position even in a location which cannot readily be reached while providing a warning in the event of reception of a wave beam which has been produced in particular by a radar set.

In accordance with yet a further distinctive feature, the box is provided on its visible face with four electroluminescent diodes each associated with a waveguide and connected by means of suitable linkages to the associated electric circuits in order to permit very rapid location of the transmitter of the detected wave beam with respect to the boat which is equipped with the antenna in accordance with the invention. For example, it can readily be determined whether the boat which transmits the detected beam is located on the port or starboard side, ahead or astern.

In accordance with still another distinctive feature, the box is provided with a fifth electroluminescent diode on its visible face in order to define each passage of the detected wave beam irrespective of the position of said beam with respect to the antenna. Preferably, said fifth diode is excited by a time-controlled signal which also excites the sound indicator in such a manner as to produce a variation in sound intensity. Said variation is intended to decrease in order to reduce the sound volume to a more or less low volume.

Further advantages and distinctive features will become more readily apparent from the following description of a preferred embodiment of the invention which is given by way of indication but not in any sense by way of limitation, reference being made to the accompanying drawings, in which.

Figures 1, 2:
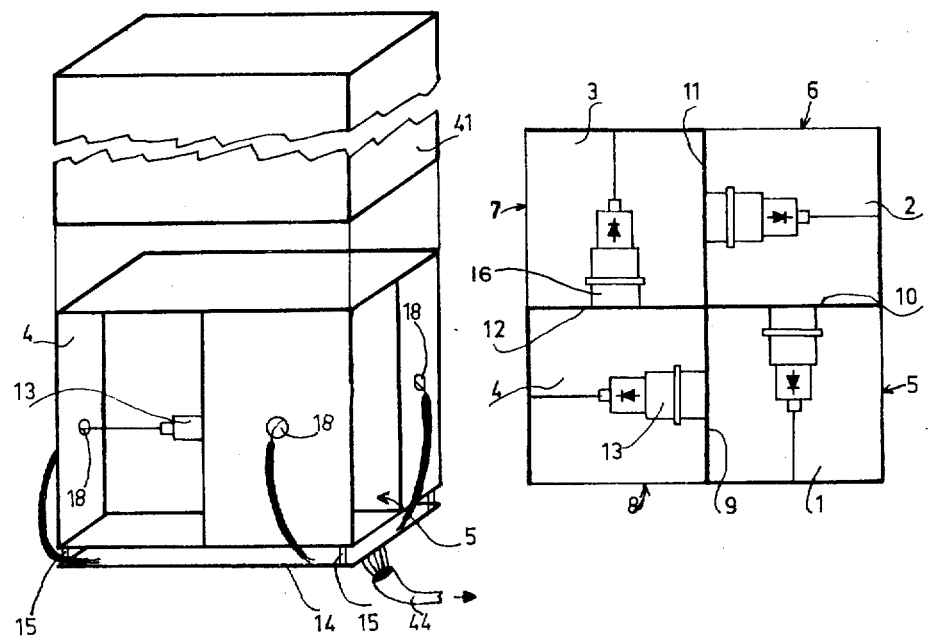
FIG. 1 is an exploded view in perspective showing the antenna and its container in accordance with the invention.
FIG. 2 is a sectional view of the antenna as shown in FIG. 1, this view being taken in a plane at right angles to the length of the waveguides.

The antenna in accordance with a preferred embodiment shown in FIGS. 1 and 2 comprises four sectors each constituted by a waveguide 1 to 4.

Each waveguide 1 to 4 is designed in the form of a right-angled parallelepiped having a small section of square shape, which has an open face 5, 6, 7 or 8 and which is closed on the side opposite to said open face by means of a wall 9, 10, 11 or 12. In this example, each long side of the waveguide measures 75 mm whilst the side of the square section measures 50 mm. The four waveguides are mounted in adjacent relation or coupled together by any suitable means in order to constitute a unitary structure in the manner shown in FIGS. 1 and 2 or, in other words, to provide only one open face of a waveguide on any one lateral side of the structure; the development of the lateral sides of the structure would show that an open face of a waveguide is followed by a wall of the adjacent waveguide. This antenna design makes it possible to close a waveguide by means of a wall of another waveguide and therefore to dispense with double walls at the level of the junctions between waveguides.

Provision is made within each waveguide 1 to 4 for a microwave transfer element 13 which, when it is employed as a detector for the wave beams emitted by an external radar system, is constituted by a microwave diode placed at right angles to the direction of said wave beam detected by the waveguide which is associated therewith.

Since each waveguide covers 90° of the horizon, it accordingly follows that the antenna is omnidirectional and covers 360° of the horizon.

The electric circuits associated with each microwave diode 13 are grouped together on a circuit support 14 which is placed at a predetermined distance from the base of the antenna proper and is connected to this latter by means of insulating distance-pieces 15 (as shown in FIG. 1).

Figure 3:
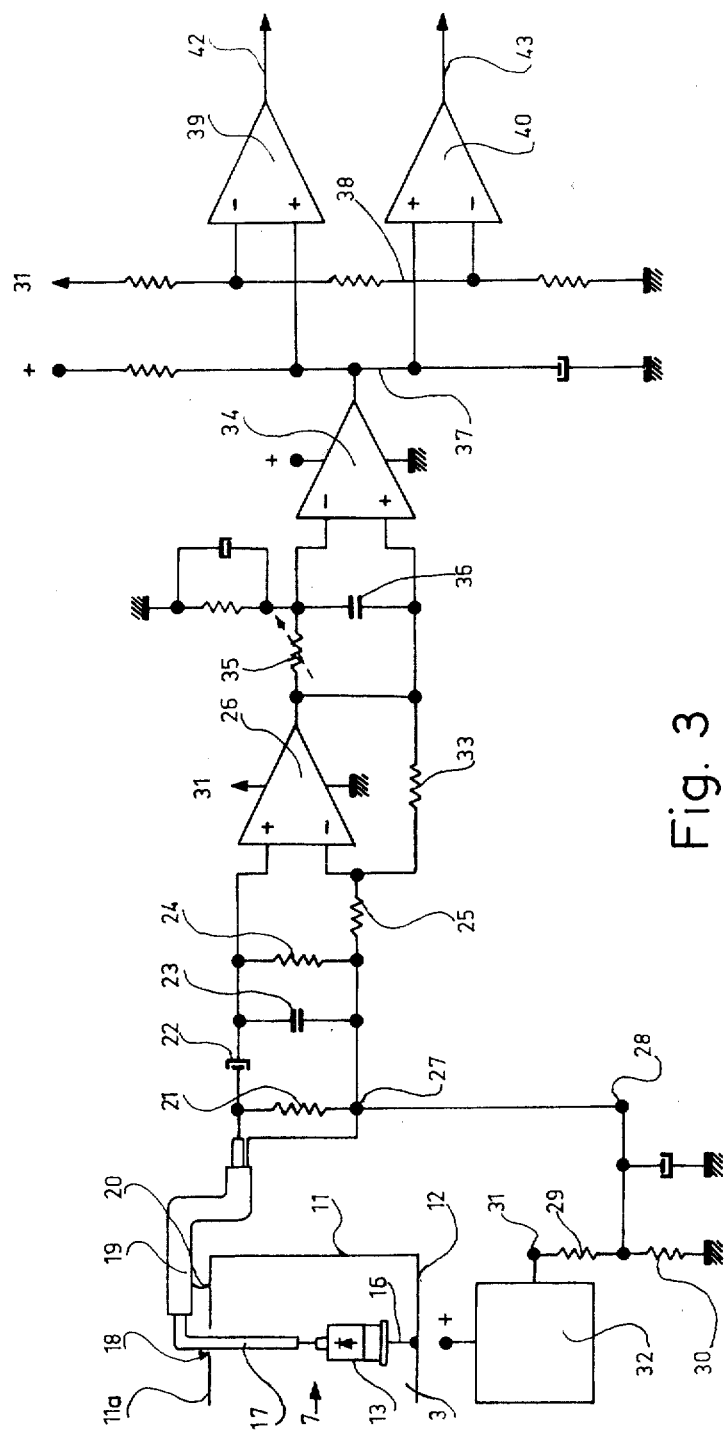
FIG. 3 is a diagrammatic illustration of the electric circuit which is assigned to each waveguide as well as the elements which are common to all the circuits.

Each microwave diode 13 is mounted on a vertical support 16 and this latter is welded to that wall of the associated waveguide which is adjacent to the open face of said waveguide and constitutes a closure wall for another waveguide. In the example under consideration, the vertical supports 16 are welded to the walls 9 to 12 of the antenna. Referring to FIG. 3 which illustrates the waveguide 3, the microwave diode 13 is connected in the conducting direction to a cable 17 which passes through an orifice 18 formed in the wall 11a and which is placed externally with respect to the antenna within a screen 19, said screen being welded externally to the outer face of the wall 11a by means of a weld bead 20.

The electric circuit corresponding to each microwave diode comprises a resistor 21 to the terminals of which are connected the cable 17 and the cable screen 19. Decoupling capacitors 22 and 23 are interposed between the resistor 21 and the input resistors 24 and 25 of an amplifier 26. The common point 27 is connected to the output 28 of a supply circuit which is common to all the circuits associated with the microwave diodes 13 and which comprises a divider constituted by two resistors 29 and 30 interposed between ground and the output terminal 31 for a reference voltage delivered by the general supply unit 32, the value of said reference voltage being 8 volts, for example. A gain resistor 33 is connected between the negative input and the output of the amplifier which amplifies the signal delivered by the microwave diode after integration. An input circuit associated with a threshold detector 34 and constituted by a resistor 35 and a capacitor 36 is connected between said threshold detector 34 and the amplifier 26. By means of suitable connections 37 and 38, the threshold detector 34 controls two timing devices 39 and 40 having different time delays.

The other electric circuits which are identical with the circuit described earlier are connected to the terminal 28 by means of their common point which corresponds to the point designated by the reference 27 in FIG. 3.

The unit constituted by the antenna and the circuit support 14 is housed within a container 41 (as shown in FIG. 1) into which is introduced a protective coating such as a polyurethane foam or the like so as to ensure that the unit is completely encapsulated, the container being of suitable shape such as a parallelepiped, a cone frustum or a cylinder.

Figure 4:
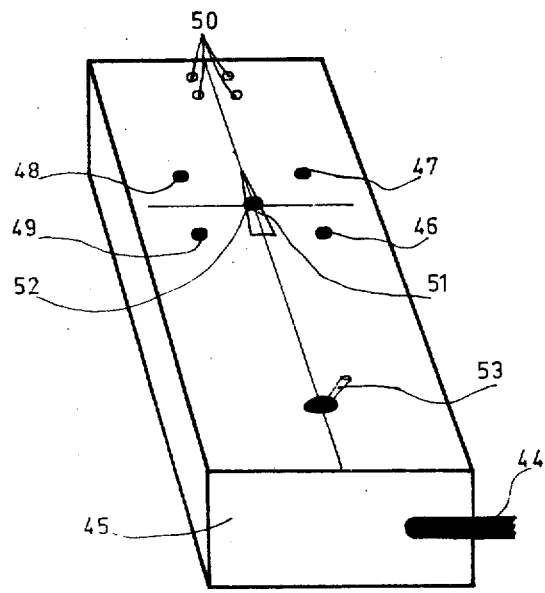
FIG. 4 is a view in perspective of the box containing the sound and light indicators.

The output conductors are brought out from the circuit support 14, protected by a sheath 44 and connected to electrical elements which are placed within a box 45 as shown in FIG. 4.

There are mounted on the top visible face 45' of the box 45 four electroluminescent diodes 46 to 49, each of which is assigned to one waveguide. To this end, the output conductor 42 of the electric circuit which is assigned to the waveguide 3 is connected to the diode 48 whilst the diode 47 is connected to the output conductor 42 of the circuit which is associated with the microwave diode of the waveguide 2, and so forth. In consequence, when one of the waveguides 1 to 4 detects a wave beam, the associated electroluminescent diode lights up and indicates the region in which the wave-beam emitter or radar set is located. Thus the diode 48 corresponds to the region ahead on the port side whilst the diode 46 corresponds to the region astern on the starboard side, and so on.

In addition, a sound alarm device represented by holes 50 on the face 45' is incorporated in the box 45 and is also excited by the signals which are available on the output conductors of the type designated by the reference 42. Thus, when no one is present in front of the box 45 which could be placed, for example, on the navigation table or close to this latter, a loud warning is given as soon as a wave beam has been detected.

When a wave beam is emitted by the radar set as this latter is moving with respect to the boat which is equipped with the antenna and represented diagrammatically on the face 45' of the box 45 by a pointer 51 whose tip is directed upwards in the figure, said wave beam is detected by the waveguides 2 and 3, for example, whereas the diodes 47 and 48 remain lighted up, thus indicating that said radar set is on the course followed by the boat or else in the line of extension of the pointer 51.

A fifth electroluminescent diode 52 is placed at the center of the area delimited by the diodes 46 to 49 and is connected to the outputs 43 of the timing devices 40 in such a manner as to define each passage of the detected wave beam irrespective of the position of the emitting radar set with respect to the antenna in accordance with the invention.

The signals delivered by the timing devices 40 are shorter than those delivered by the timing devices 39 and also control the sound alarm device 50 in such a manner as to produce a variation in sound intensity. This variation is intended to reduce the sound intensity at the end of a period which is determined by the time-lag between the timing devices 39 and 40 in order to ensure that a high volume of sound is not maintained throughout the detection period.

Provision is also made for a key 53 which serves to control the light and sound alarm devices. Between the "start" and "stop" positions, said key is capable of taking up an intermediate half-tonality position which makes it possible to maintain the sound volume of the alarm device 50 at half-volume so that it can be audible, for example, only inside the cabin if the box is placed within said cabin.

It can be noted from the foregoing description that the signal delivered by each microwave diode 13 is processed directly by direct amplification, that is to say without preliminary shaping or any other treatment by means of a local oscillator. This proves desirable in the case of a short range between 1.5 and 8 kilometers, for example, which is wholly sufficient to permit handling and maneuvering of the small boats which are to be equipped with the antenna in accordance with the invention.

Although the antenna herein described comprises four waveguides connected together to form a unitary structure, it is readily apparent that use could be made of only two waveguides covering 180° of the horizon. To this end, the two waveguides can be arranged in the same manner as the waveguides 1 and 2 or 2 and 3, for example with the open face 5 at right angles to the open face 6, or alternatively in the same manner as the waveguides 2 and 4 or 1 and 7, for example with the open face 5 parallel to the open face 7 in which they are located in opposite and outward directions.

It is readily apparent that the length of the connections between the antenna and the box are suited to the distance from said antenna which is located for example at the mast-head or on the cross-tree but preferably as high as possible with respect to the box which is placed on the contrary in an accessible location such as the navigation table in order that the control key can readily be actuated.

Another identical box but of leak-tight design can also be coupled to the box 45 and placed outside, either on the bridge or any other external part of the boat.

Apart from its small overall size, the advantages of the antenna in accordance with the invention lie in total independence which does not call for any qualified personnel and entails very low power consumption of the order of 10 mA.

Furthermore, the microwave transfer elements 13 can be employed as wave emitters so that the waves can be detected both by the radar sets of large boats and by small boats equipped with an antenna as described in the foregoing. Under these conditions, it is readily apparent that the electric circuits must be adapted to transmit power in the form of electric waves. Similarly, the microwave transfer elements can be designed to detect and emit alternately and the associated electric circuits must accordingly be adapted to permit an operation of this type.

As will readily be understood, the invention is not limited in any sense to the embodiment hereinabove described with reference to the accompanying drawings. Depending on the applications which are contemplated, a number of alternative forms within the capacity of anyone versed in the art can accordingly be contemplated without thereby departing either from the scope or the spirit of the invention.

From this it follows that, instead of employing square-section rectangular waveguides as shown in FIGS. 1 and 2, it would be possible to employ other forms of waveguides such as frusto-conical, pyramidal waveguides and so forth.

Similarly, it is possible to reduce the range of the antenna by modifying one of the elements of the electric circuits in such a manner as to modify the sensitivity of the antenna. In fact, when a boat is travelling on a river or canal, it can pass in the proximity of stationary emission sources placed on land. Under these conditions, the antenna should not detect such sources.

In order to obtain a reduction in range of the antenna, it is only necessary to modify the reference voltage of the voltage threshold by incorporating a potentiometer instead of the resistor 35; adjustment of the useful resistance of said potentiometer will thus be a function of the new threshold value which is chosen. It will clearly be possible to provide said potentiometer with a control device which is accessible from the exterior in order to adapt the antenna to utilization at sea or on a river or canal.

I claim:

1. An antenna for short-range reception of a signal emitted by an emission source, of the type comprising a sector for locating said source, a microwave detecting element placed within said sector, wherein said antenna comprises at least two sectors which constitute a unitary structure and are directionally independent of each other and each constituted by a waveguide having a single open face which is oriented in the intended direction of surveillance, said detecting element being disposed at right angles to and at the geometrical center of the supporting wall the waveguide associated with said detecting element, the frequencies detected by said antenna being within the range of $10^9$ Hz to $30 \times 10^9$ Hz, an alarm device mounted in a housing located at a distance from said antenna, and means for connecting said detecting element to said alarm device, said connecting means including means for amplifying the signal delivered by said detecting element before exciting said alarm device, whereby said unitary structure of said antenna waveguides can be mounted at any desired location on a vessel and said housing containing said alarm device can be placed at a location on the vessel for convenient observation.

2. An antenna according to claim 1, wherein each waveguide has a supporting wall adjacent to the open face thereof.

3. An antenna according to claim 1, wherein the open faces of the waveguides are located in perpendicular planes so as to cover 180° of the horizon.

4. An antenna according to claim 1, wherein the open faces of the waveguides are located in opposite and outward directions.

5. An antenna according to claim 1, wherein said antenna is omnidirectional and comprises four waveguides each covering 90° of the horizon.

6. An antenna according to claim 5, wherein the four waveguides are grouped together so as to constitute a unitary structure.

7. An antenna according to claim 1, wherein said alarm device is constituted in particular by light and sound indicators.

8. An antenna according to claim 1, wherein each waveguide is rectangular.

9. An antenna according to claim 1, wherein said antenna is housed within a container together with its associated electric circuits, coating material such as polyurethane foam being introduced into said container in order to encapsulate the assembly constituted by said antenna and said electric circuits.

10. An antenna according to claim 1, wherein said housing is provided on the visible face thereof with a corresponding plurality of electroluminescent diodes each associated with one waveguide and coupled with the associated electric circuits of said waveguides by means of suitable connections.

11. An antenna according to claim 10, further including an indicator on said visible face of said housing representative of the vessel carrying said antenna, said electroluminescent diodes being located on said housing face relative to said indicator and to each other in a manner permitting rapid visual determination of the positional location of the source of the detected wave beam relative to the vessel carrying said antenna.

12. An antenna according to claim 1, wherein the housing is provided on the visible face thereof with an electroluminescent diode so as to define each passage of the detected beam irrespective of the position of said beam with respect to said antenna.

13. An antenna according to claim 1, wherein said microwave detecting element comprises a microwave diode.

14. An antenna for short-range reception of a signal emitted by an emission source, of the type comprising a sector for locating said source, a microwave diode placed within said sector, wherein said antenna comprises at least two sectors which are independent of each other and each constituted by a waveguide having a single open face which is oriented in the intended direction of surveillance, said diode being disposed at right angles to and at the geometrical center of the supporting wall of the waveguide associated with said diode, the frequencies detected by said antenna being with the range of $10^9$ Hz to $30 \times 10^9$ Hz, the signal delivered by the diode being amplified before exciting an alarm device constitued in particular by light and sound indicators mounted within a housing located at a distance from said antenna, said housing being provided on the visible face thereof with an electroluminescent diode so as to define each passage of the detected beam irrespective of the position of said beam with respect to said antenna, said electroluminescent diode being excited by a time-controlled signal which also excites the sound indicator in order to produce a variation in sound intensity.

15. An antenna according to claim 14, wherein said sensitivity varying means comprises a voltage threshold detector including a potentiometer for adjusting the reference voltage of said detector.

16. An antenna for short-range reception of a signal emitted by an emission source, of the type comprising a sector for locating said source, a microwave detecting element placed within said sector, wherein said antenna comprises at least two sectors which are independent of each other and each constituted by a waveguide having a single open face which is oriented in the intended direction of surveillance, said detecting element being disposed at right angles to and at the geometrical center of the supporting wall of the waveguide associated with said detecting element, the frequencies detected by said antenna being within the range of $10^9$ Hz to $30 \times 10^9$ Hz, the signal delivered by the detecting element being processed directly by signal processing means in order to permit a variation in range of said antenna.

17. An antenna according to claim 16, wherein said microwave detecting element comprises a microwave diode.

18. An antenna for short-range reception of a signal emitted by an emission source, of the type comprising a sector for locating said source, a microwave detecting element placed with said sector, wherein said antenna comprises at least two sectors which are independent of each other and each constituted by a waveguide having a single open face which is oriented in the intended direction of surveillance, said detecting element being disposed at right angles to and at the geometrical center of the supporting wall of the waveguide associated with said diode, the frequencies detected by said antenna being within the range of $10^9$ Hz to $30 \times 10^9$ Hz, electrical circuit means operatively connected to said detecting element for processing the signal delivered by said detecting element, said circuit means including adjustable means for varying the sensitivity of said antenna to thereby vary the range of said antenna.

19. An antenna according to claim 18, wherein said microwave detecting element comprises a microwave diode.

* * * * *